US010154519B2

(12) United States Patent
Ramos et al.

(10) Patent No.: US 10,154,519 B2
(45) Date of Patent: Dec. 11, 2018

(54) PRACH SELECTION IN COMBINED RADIO CELL DEPLOYMENTS

(71) Applicant: Telefonaktiebolaget LM Ericsson (publ), Stockholm (SE)

(72) Inventors: Edgar Ramos, Kirkkonummi (FI); Min Wang, Luleå (SE); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 181 days.

(21) Appl. No.: 15/119,576

(22) PCT Filed: Feb. 19, 2014

(86) PCT No.: PCT/SE2014/050201
§ 371 (c)(1),
(2) Date: Aug. 17, 2016

(87) PCT Pub. No.: WO2015/126288
PCT Pub. Date: Aug. 27, 2015

(65) Prior Publication Data
US 2017/0064742 A1    Mar. 2, 2017

(51) Int. Cl.
*H04W 74/08*      (2009.01)
*H04W 24/08*      (2009.01)
(Continued)

(52) U.S. Cl.
CPC ....... *H04W 74/0833* (2013.01); *H04W 24/08* (2013.01); *H04W 74/006* (2013.01); *H04W 28/18* (2013.01); *H04W 64/00* (2013.01)

(58) Field of Classification Search
CPC ..... H04W 24/08; H04W 28/18; H04W 64/00; H04W 72/04; H04W 74/00;
(Continued)

(56) References Cited

U.S. PATENT DOCUMENTS 9,736,863 B2 * 8/2017 Yang ................. H04W 74/0833
9,924,546 B2 * 3/2018 Liu .................... H04W 74/0866
(Continued)

FOREIGN PATENT DOCUMENTS

EP    2654361 A1    10/2013

OTHER PUBLICATIONS

Unknown, Author, "Mobility and Node Selection in Combined Cell Deployment for Heterogeneous Networks", Ericsson, ST-Ericsson, 3GPP TSG RAN WG2 Meeting #83, R2-132620, Barcelona, Spain, Aug. 19-23, 2013, 1-9.
(Continued)

*Primary Examiner* — Tri H Phan
(74) *Attorney, Agent, or Firm* — Sage Patent Group

(57) ABSTRACT

This disclosure relates to PRACH configuration selection in combined radio cell deployments. According to one example embodiment, a network node establishes (220) a plurality of different PRACH configurations. Each PRACH configuration is generally mapped to a respective radio unit of the several radio units of the combined radio cell. Also, the network node determines (230) a location of at least one wireless communication device. In dependence of the determined location of the at least one wireless communication device, the network node further selects (240) a set of PRACH configurations that is available for the at least one wireless communication device. Moreover, the network node transmits (250) a radio signal comprising information about the set of PRACH configurations that is available for the at least one wireless communication device.

16 Claims, 7 Drawing Sheets

(51) Int. Cl.
*H04W 64/00* (2009.01)
*H04W 74/00* (2009.01)
*H04W 28/18* (2009.01)

(58) Field of Classification Search
CPC .............. H04W 74/006; H04W 74/08; H04W 74/0833; H04W 84/04
See application file for complete search history.

(56) References Cited

U.S. PATENT DOCUMENTS

| | | | | |
|---|---|---|---|---|
| 2010/0296467 | A1* | 11/2010 | Pelletier | H04W 74/002 370/329 |
| 2011/0039499 | A1* | 2/2011 | Zhang | H04W 74/008 455/67.11 |
| 2011/0105135 | A1 | 5/2011 | Krishnamurthy et al. | |
| 2011/0294513 | A1* | 12/2011 | Li | H04W 74/008 455/450 |
| 2013/0028180 | A1 | 1/2013 | Gao et al. | |
| 2013/0286958 | A1 | 10/2013 | Liang et al. | |
| 2013/0301591 | A1* | 11/2013 | Meyer | H04W 74/0833 370/329 |
| 2015/0215911 | A1* | 7/2015 | Dimou | H04W 48/12 370/329 |
| 2017/0303261 | A1* | 10/2017 | Hou | H04W 72/048 |
| 2017/0332413 | A1* | 11/2017 | Pelletier | H04W 74/0833 |

OTHER PUBLICATIONS

Unknown, Author, "PRACH Enhancement and UL Power Control for CoMP Scenario 4", Research in Motion, UK Limited, 3GPP TSG RAN WG1 Meeting #66, R1-112372, Athens, Greece, Aug. 22-26, 2011, 1-6.

3GPP, "3rd Generation Partnership Project; Technical Specification Group Radio Access Network; Radio Resource Control (RRC); Protocol specification (Release 11)", 3GPP TS 25.331 V11.7.0, Sep. 2013, 1-2085.

Unknown, Author, "Overview of Combined Cell Deployment in Heterogeneous Networks", 3GPP TSG RAN WG1 Meeting #72, R1-130610, Ericsson, St. Julian's, Malta, Jan. 28-Feb. 1, 2013, 1-12.

* cited by examiner

PRACH SELECTION IN COMBINED RADIO CELL DEPLOYMENTS

TECHNICAL FIELD

The present disclosure generally relates to radio communication. In particular, the disclosure relates to Physical Random Access Channels (PRACH) configuration selection in combined radio cell deployments.

BACKGROUND

Radio communication networks are widely deployed to provide various communication services such as telephony, video, data, messaging, broadcasts, and so on. Such radio communication networks support communications for multiple wireless communication devices (sometimes referred to as User Equipments (UEs) herein) by sharing the available network resources. One example of such a network is the Universal Mobile Telecommunications System (UMTS), a third generation (3G) technology standardized by the 3rd Generation Partnership Project (3GPP). UMTS includes a definition for a Radio Access Network (RAN), referred to as UMTS Terrestrial Radio Access Network (UTRAN). The UMTS, which is the successor to Global System for Mobile Communications (GSM) technologies, supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications. For example, third-generation UMTS based on W-CDMA has been deployed in many places of the world. To ensure that this system remains competitive in the future, 3GPP began a project to define the long-term evolution of UMTS cellular technology. The specifications related to this effort are formally known as Evolved UMTS Terrestrial Radio Access (E-UTRA) and Evolved UMTS Terrestrial Radio Access Network (E-UTRAN), but are more commonly referred to by the name Long Term Evolution (LTE). More detailed descriptions of radio communication networks and systems can be found in literature, such as in Technical Specifications published by, e.g., the 3GPP.

PRACH is used for random access. According to the 3GPP Technical Specification TS 25.331 (v. 11.7.0), section 8.5.17 "PRACH selection" it is specified that the UE shall select the PRACH code randomly. After the selection of the PRACH index, then the UE proceeds with the signature selection based on the IE element Available Signature from "PRACH info" in case of proceeding with a RACH transmission or based on the IE element Available Signature from "PRACH preamble control parameters (for Enhanced Uplink)" in the case of E-DCH transmission. Thus, the PRACH selection is the selection of the physical channel and it follows the section 8.5.17 of 3GPP TS 25.331.

Further sections 8.5.73 and 8.5.74 of 3GPP TS 25.331 provide the parameters of how to access a specific set of PRACH configurations. If several PRACH configurations exist the selection is done for such candidate PRACH configurations. Further sections 10.3.6.55, 10.3.6.52, and 10.3.6.134 of 3GPP TS 25.331 specify a PRACH system information list, PRACH information and PRACH preamble control parameters extension list (for Enhanced Uplink), respectively.

Although the existing art with respect to the PRACH configuration selection provides many advantages, the inventors have realized that the existing PRACH configuration selection may be inadequate in future radio cell deployments.

SUMMARY

It is therefore a general object of the embodiments herein to provide an alternative PRACH configuration selection. More particularly, the embodiments disclosed herein address the general object of providing a PRACH configuration selection for combined radio cell deployments.

This general object and others are thus addressed by the embodiments defined in the appended claims.

As has been realized by the inventors, the introduction of combined radio cell deployments introduces a need for a further development of the PRACH configuration selection.

In accordance with one aspect disclosed herein, a method performed by a network node of a wireless telecommunication network is provided. The network node operates in a combined radio cell deployment. That is, several radio units are controlled by the network node and each of the several radio units serves a respective radio cell sector of the combined radio cell. The method comprises establishing a plurality of different PRACH configurations, wherein each PRACH configuration is mapped to a respective radio unit of the several radio units. Also, a location of at least one wireless communication device (e.g. at least one UE) is determined. Furthermore, the method comprises selecting, in dependence of the determined location of the at least one wireless communication device, a set of PRACH configurations that is available for the at least one wireless communication device. Moreover, the method comprises transmitting, to the at least one wireless communication device, a radio signal comprising information about the set of PRACH configurations that is available for the at least one wireless communication device.

For example, determining the location of said at least one wireless communication device may involve collecting (e.g. obtaining, acquiring or receiving) location information from each one of the several radio units, wherein the location information comprises information indicative of the location of the at least one wireless communication device. The location information may comprise information about measured signal parameters related to radio link quality. As one example, the location information may comprise information about Fractional Common Pilot Channel (F-CPICH) measurements performed by the at least one wireless communication device.

In accordance with another aspect, a method performed by a wireless communication device (e.g. a UE) is provided. The wireless communication device operates in a combined radio cell deployment. That is, several radio units are controlled by a network node and each of the several radio units serves a respective radio cell sector of the combined radio cell. The method comprises receiving, from the network node, information about a set of PRACH configurations that is available for the wireless communication device, wherein each PRACH configuration of the set of PRACH configurations is mapped to a respective radio unit of the several radio units. Also, the wireless communication device performs radio link quality measurements. Next, the wireless communication device selects a PRACH configuration from the received set of PRACH configurations based on the performed radio link measurements in order to perform random access. In some embodiments, the radio link quality measurements may comprise performing F-CPICH measurements.

In accordance with yet a further aspect, a network node of a wireless telecommunication network is provided. The network node is configured to operate in a combined radio cell deployment. Several radio units are controllable by the network node and each of the several radio units is capable of serving a respective radio cell sector of a combined radio cell. The network node comprises: means adapted to establish a plurality of different PRACH configurations, wherein each PRACH configuration is mapped to a respective radio unit of the several radio units; means adapted to determine a location of at least one wireless communication device; means adapted to select, in dependence of the determined location of the at least one wireless communication device, a set of PRACH configurations that is available for the at least one wireless communication device; and means adapted to transmit, to the at least one wireless communication device, a radio signal comprising information about the set of PRACH configurations that is available for the at least one wireless communication device.

The network node may comprise means adapted to collect (e.g. obtain, acquire, or receive) location information from each one of the several radio units, the location information comprising information indicative of the location of the at least one wireless communication device. The location information may comprise information about measured signal parameters related to radio link quality. For instance, the location information may comprise information about F-CPICH measurements performed by the at least one wireless communication device.

In accordance with still another aspect, a wireless communication device is provided. The wireless communication device is configured to operate in a combined radio cell deployment. Several radio units are controllable by a network node and each of the several radio units is capable of serving a respective radio cell sector of the combined radio cell. The wireless communication device comprises: means adapted to receive, from the network node, information about a set of PRACH configurations that is available for the wireless communication device, wherein each PRACH configuration of the set of PRACH configurations is mapped to a respective radio unit of the several radio units; means adapted to perform radio link quality measurements; and means adapted to select a PRACH configuration from the received set of PRACH configurations based on the performed radio link measurements in order to perform random access. The wireless communication device may comprise means adapted to perform F-CPICH measurements.

In accordance with yet another aspect, a computer program is provided. The computer program comprises instructions which, when executed on at least one processor of an apparatus, will cause the apparatus to: establish a plurality of different Physical Random Access Channel (PRACH) configurations, wherein each PRACH configuration is mapped to a respective radio unit of the several radio units; determine a location of at least one wireless communication device; select, in dependence of the determined location of the at least one wireless communication device, a set of PRACH configurations that is available for the at least one wireless communication device; and to transmit, to the at least one wireless communication device, a radio signal comprising information about the set of PRACH configurations that is available for the at least one wireless communication device.

In accordance with still another aspect, a carrier comprising the above-mentioned computer program is provided. The carrier may be one of the following: an electronic signal, optical signal, radio signal, or computer readable storage medium.

Yet further, another aspect relates to a computer program comprising instructions which, when executed on at least one processor of an apparatus, will cause the apparatus to receive, from a network node, information about a set of Physical Random Access Channel, PRACH, configurations that is available for the wireless communication device, wherein each PRACH configuration of the set of PRACH configurations is mapped to a respective radio unit of the several radio units; perform radio link quality measurements; and select a PRACH configuration from the received set of PRACH configurations based on the performed radio link measurements in order to perform random access. A carrier comprising this computer program is also suggested. The carrier may be one of the following: an electronic signal, optical signal, radio signal, or computer readable storage medium.

An advantage with embodiments described in this disclosure is that the PRACH configurations are mapped to respective, or specific, radio units of the combined radio cell and that the location of the at least one wireless communication device (e.g. a UE) is determined. Thus, a set of PRACH configurations can be selected by taking the location of the at least one wireless communication device into account. Also, a set of PRACH configurations that is considered appropriate, or suitable, for the at least one wireless communication device is selected based on the determined location. As a consequence, a wireless communication device can perform its PRACH configuration selection from the set of PRACH configurations that are considered appropriate, or suitable. Compared with the existing art, the wireless communication device may thus perform its PRACH configuration selection from a limited number of prioritized candidate PRACH configurations. Furthermore, the wireless communication device may perform its PRACH configuration selection from candidate PRACH configurations where all, or nearly all, candidate PRACH configurations are considered to be appropriate, or suitable, for the wireless communication device in question. Thus, the embodiments described herein may allow for an improved PRACH configuration selection for combined radio cell deployments where the location of the wireless communication device(s) may have an impact of the overall resource utilization.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The technology will now be described more fully hereinafter. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps (or actions) throughout the description.

Figure 1:
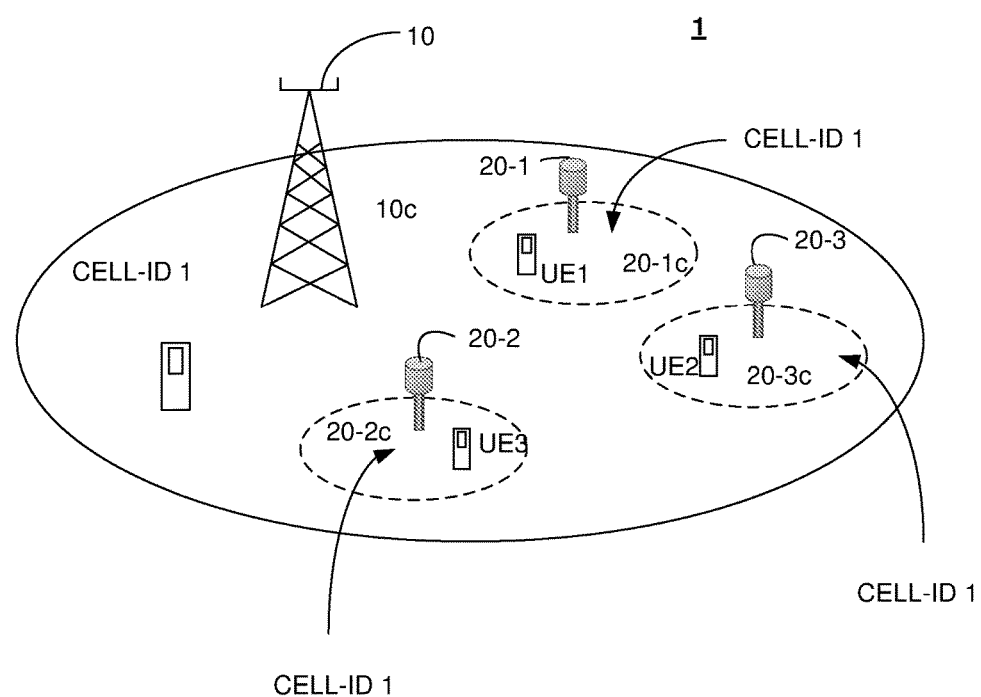
FIG. 1 shows an example of a radio network utilizing a combined cell deployment.

FIG. 1 illustrates an example of a radio communication network 1 utilizing a combined radio cell deployment. The combined radio cell deployment provides an alternative to the classical radio cell deployment. An idea behind the combined radio cell deployment is to let all the wireless communication devices (e.g. UE1, UE2, UE3) within the geographical area outlined by the coverage of a network node 10 be served with signals associated with the same cell-id (e.g. the same Physical Cell Identity (PCI)). In other words, from the perspective of the wireless communication device, the received signals appear coming from a single radio cell. This is illustrated in FIG. 1 and is generally referred to as combined cell deployment, shared cell deployment or soft cell deployment. Note that only one macro point (i.e. network node 10) is shown, other macro points would typically use different cell-ids (corresponding to different radio cells) unless they are co-located at the same site (corresponding to other radio cell sectors of the macro site). In the latter case of several co-located macro points, the same cell-id may be shared across the co-located macro points and those pico points (i.e. radio units 20-1, 20-2, 20-3) that correspond to the union of the coverage areas of the macro point(s). In a combined radio cell, the comparatively larger radio cell 10c may be referred to as the radio cell whereas the smaller radio cells 20-1c, 20-2c, 20-3c may be referred to as radio cell sectors or sectors. Sync channels, BCH (Broadcast Channels) and control channels may all be transmitted from the high power point (i.e. the network node 10) while data can be transmitted to a wireless communication device also from low power points (e.g. the radio units 20-1, 20-2, 20-3) by using shared data transmissions (e.g. a Physical Downlink Shared Channel (PDSCH)) relying on resources that are specific to the wireless communication devices.

An advantage of the combined cell deployment compared with the classical deployment is that the typically involved handover procedure between cells may only need to be invoked on a macro basis. Moreover, there is generally also greater flexibility in coordination and scheduling among the network node 10 and the several radio units 20-1, 20-2, 20-3.

The network node 10 may e.g. be embodied as a radio base station. The radio base station may be a Radio Base Station (RBS), a NodeB, or an evolved NodeB. Furthermore, a radio unit 20-1, 20-2, 20-3 may be a Remote Radio Unit (RRU).

There exist different transmission modes in a combined radio cell deployment. The different transmission modes can be divided into:

Single Frequency Network (SFN): In this mode, a plurality of nodes (e.g. network node 10 and radio units (20-1, 20-2, 20-3) transmit the same data to a specific wireless communication device (e.g. UE1, UE2, or UE3). Hence, the signal to noise ratio of the wireless communication device may be improved. The main idea of this mode is to combine signals over the air from all involving nodes by means of transmitting exactly the same pilot, control channels and data channel in downlink using the same carrier frequency and spreading and scrambling codes Node selection with Spatial Re-use (SR): In the SFN mode, all nodes are transmitting the same downlink signal. Hence, this may not give capacity gains when the traffic load is high as SFN mode is primarily used for coverage improvement. Since many nodes don't contribute to the performance improvement; the resources from the nodes are not always used effectively. The interference pattern in combined cell deployment is similar to that of co-channel deployment; it may use the resources from these nodes to schedule different wireless communication devices. In this mode, the same pilot primary common pilot (P-CPICH) is transmitted from all the nodes. The downlink control channel and the data traffic are scheduled to different wireless communication devices from different nodes, based on their position in the cellular network and the available resources. Since the scheduling may be done per combined cell, the central scheduler (e.g. the network node 10) may decide which node should transmit to which wireless communication device of the various wireless communication device.

MIMO mode with spatially separated nodes: In this mode, the radio units 20-1, 20-2, 20-3 may act like distributed MIMO, i.e. MIMO transmission with spatially separated antennas. In this mode, MIMO gains (both diversity and multiplexing gains) may be achieved. It is well known among persons skilled in the art that distributed MIMO provides significant capacity gains (better than MIMO transmission with co-located antennas)

In a combined radio cell deployment it is generally the radio network node 10 (sometimes referred to as "the central controller") that takes responsibility for collecting operational information, operational data or operational statistics from various measurements that are made throughout the combined radio cell. Typically, but not necessarily, the decision of which radio unit 20-1, 202, 20-3 that should transmit to a specific wireless communication device is made by the radio network node 10 based on the collected operational information, operational data or operational statistics. The operational information, operational data or operational statistics may be collected (e.g. obtained, acquired, or received) from the various radio units 20-1, 20-2, 20-3. Additionally, or alternatively, this operational information, operational data or operational statistics may be collected directly from the wireless communication devices (e.g. UE1, UE2, UE3) that are present in the combined radio cell.

Figure 2:
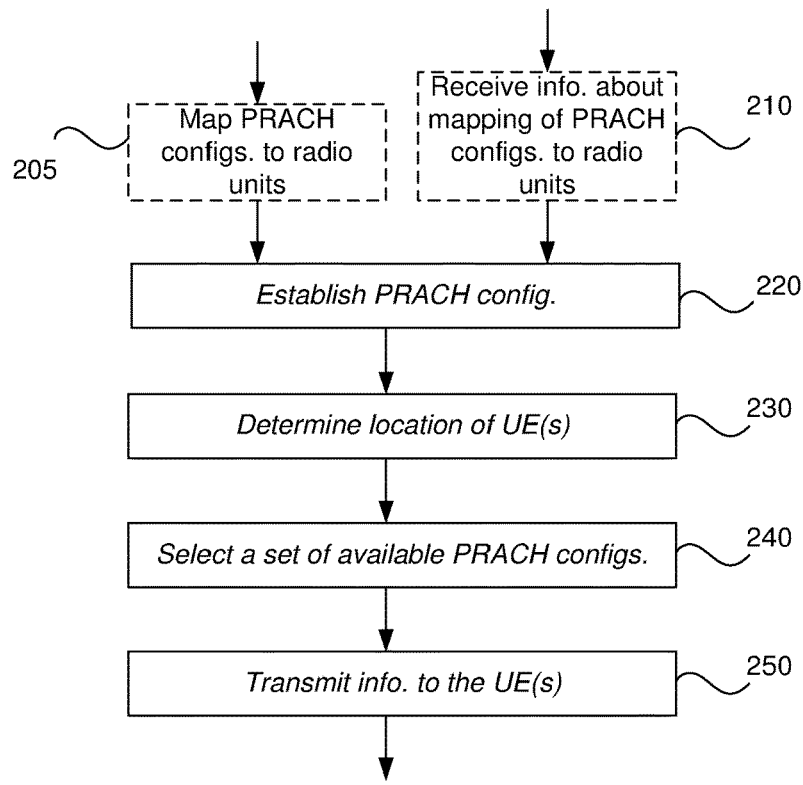
FIG. 2 is a flowchart of an example method performed by a network node.

With reference to FIG. 2, an example method performed by, or otherwise implemented in, a network node 10 will be described. The network node 10 operates in a combined radio cell deployment, such as the example illustrated in FIG. 1. Several radio units 20-1, 20-2, 20-3 are controlled by the network node 10. Each radio unit of the several radio units 20-1, 20-2, 20-3 serving a respective radio cell sector 20-1c, 20-2c, 20-3c of the combined radio cell 10c.

Action 205 (optional): The network node 10 may map each PRACH configuration of a plurality of PRACH configurations to a respective radio unit. In other words, the network node 10 may provide a list of PRACH configurations, where each PRACH configuration is mapped to one or several radio units. For example, the mapping could be provided in the form of a Look Up Table (LUT), see table 1. As will be understood, each radio unit 20-1, 20-2 and 20-3 of the several radio units of the combined radio cell may thus be mapped to one or several PRACH configurations. In some embodiments, each radio unit 20-1, 20-2 and 20-3 of the several radio units of the combined radio cell may be mapped to a pre-defined number (e.g. 1, 2 or 3) of PRACH configurations.

TABLE 1

Example LUT of mapping between PRACH configurations and radio units.

| MAPPING | PRACH CONFIGURATION | RADIO UNIT(S) |
|---|---|---|
| #1 | PRACH1 | 20-1, 20-2 |
| #2 | PRACH2 | 20-1, 20-2, 20-3 |
| #3 | PRACH3 | 20-2, 20-3 |
| #4 | PRACH4 | 20-3 |
| #n | PRACHn | 20-1, 20-3 |

Action 210 (optional): Alternatively, or additionally, the network node 10 may receive a radio signal from another network node, wherein said radio signal comprises information about a plurality of different Physical Random Access Channel (PRACH) configurations and wherein each PRACH configuration is mapped to a respective radio unit of the several radio units. For example, this information could be provided in the form of a LUT in a similar manner as described with respect to action 105. Again, it should be appreciated that each PRACH configuration may be mapped to one or several (respective) radio units. Thus, each radio unit 20-1, 20-2 and 20-3 of the several radio units of the combined radio cell may be mapped to a pre-defined number (e.g. 1, 2 or 3) of PRACH configurations. In some embodiments, said another network node may be a Radio Network Controller (RNC) or a similar entity. In alternative embodiments, said another network node may be a Mobility Management Entity (MME) or a similar entity.

Action 220: A plurality of different PRACH configurations is established. As described earlier, each PRACH configuration is mapped to a respective radio unit of the several radio units.

Action 230: The location of at least one (i.e. one, two or more) wireless communication device (e.g. UE1, UE2, UE3, see FIG. 1) is determined. As will be appreciated by those skilled in the art, there exist various ways of determining the location of the at least one wireless communication device. As a mere example, the determination of the location of the at least one wireless communication device may involve collecting (e.g. obtaining, acquiring, or receiving) location information from each one of the several radio units 20-1, 20-2, 20-3, wherein the location information comprises information indicative of the location of the at least one wireless communication device. The location information may comprise information about measured signal parameters related to radio link quality.

As is known among persons skilled in the art, the reference signal which is unique to each node (e.g. network node 10, radio units 20-1, 202, 20-3) in a combined cell is called Fractional CPICH (F-CPICH). This reference signal may be transmitted from each node simultaneously and/or continuously. The F-CPICH is generally characterized by a spreading code (typically SF=256 (SF is an abbreviation for Spreading Factor)) and a scrambling code which is either the primary scrambling code or a secondary scrambling code of the combined radio cell. The inventors have realized that the above-mentioned location information may comprise information about Fractional Common Pilot Channel (F-CPICH) measurements performed by the at least one wireless communication device. In fact, F-CPICH measurements may be particularly advantageous. F-CPICH measurements as such have been proposed in the 3GPP discussions as a viable measurement for selection of radio unit in the so-called CELL_DCH state.

Other ways of determining the location, or position, of the at least one wireless communication device are of course also conceivable.

Action 240: The network node 10 selects, or otherwise chooses, a set of PRACH configurations that is available for the at least one wireless communication device. This selection is done in dependence of the determined location of the at least one wireless communication device. Thus, the set of PRACH configurations provides a list of candidate PRACH configurations that is considered appropriate, or suitable, in dependence of the location (or position) of the at least one wireless communication device.

Action 250: The network nodes 10 transmits, to the at least one wireless communication device, a radio signal comprising information about the selected set of PRACH configurations that is available for the at least one wireless communication device.

Figure 3:
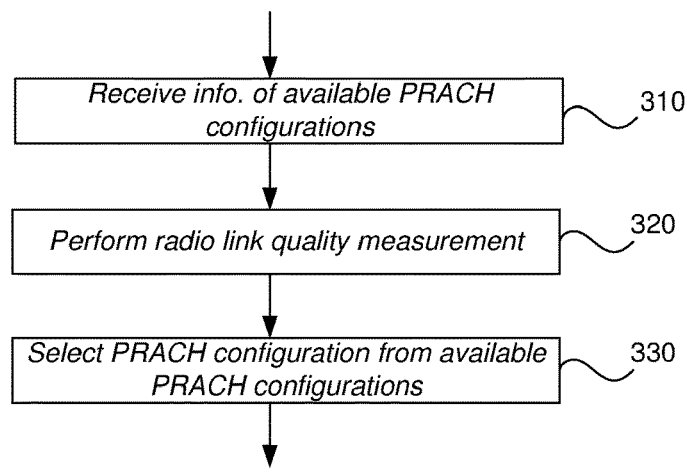
FIG. 3 is a flowchart of an example method performed by a wireless communication device.

With reference to FIG. 3, an example method performed by, or otherwise implemented in, a wireless communication device (e.g. UE1, see FIG. 1) will be described. The wireless communication device UE1 operates in a combined radio cell deployment, such as the example illustrated in FIG. 1. Several radio units 20-1, 20-2, 20-3 are controlled by a network node 10 and where each of the several radio units 20-1, 20-2, 20-3 is serving a respective radio cell sector 20-1c, 20-2c, 20-3c of the combined radio cell 10c.

Action 310: The wireless communication device UE1 receives, from the network node 10, information about a set of PRACH configurations that is available for the wireless communication device. Each PRACH configuration in the set of PRACH configurations is mapped to a respective radio unit of the several radio units.

Action 320: The wireless communication device performs radio link quality measurements. As will be appreciated by those skilled in the art, there exist various radio link quality measurements that could be performed. In some embodiments, the wireless communication device performs F-CPICH measurements.

Action 330: In order to perform a subsequent random access, the wireless communication device selects a PRACH configuration from the received set of PRACH configurations. The selection among the candidate PRACH configurations in the received set of PRACH configurations may be made randomly in a same or similar manner as in the existing art. However, it is more beneficial to select a PRACH configuration non-randomly from the received set of PRACH configurations. Therefore, and according to some embodiments, a PRACH configuration is selected non-randomly from the received set of PRACH configurations. Advantageously, and according to some embodiments, the selection is made based on the earlier-performed radio link measurements. Thus, it is possible for the wireless communication device to select a PRACH configuration from the received set of PRACH configurations that is appropriate, or suitable, in view of the earlier-performed radio link measurements.

It is an advantage that the PRACH configurations are mapped to respective, or specific, radio units of the combined radio cell and that the location of the at least one wireless communication device (e.g. a UE) is determined. Thus, a set of PRACH configurations can be selected by taking the location of the at least one wireless communication device into account. Also, a set of PRACH configurations that is considered appropriate, or suitable, for the at least one wireless communication device is selected based on the determined location. As a consequence, a wireless communication device can perform its PRACH configuration selection from the set of PRACH configurations that are considered appropriate, or suitable. Compared with the existing art, the wireless communication device may thus perform its PRACH configuration selection from a limited number of prioritized candidate PRACH configurations. Furthermore, the wireless communication device may perform its PRACH configuration selection from candidate PRACH configurations where all, or nearly all, candidate PRACH configurations are considered to be appropriate, or suitable, for the wireless communication device in question. Thus, the embodiments described herein may allow for an improved PRACH configuration selection for combined radio cell deployments.

Additional, or Alternative, Embodiments

Figure 4:
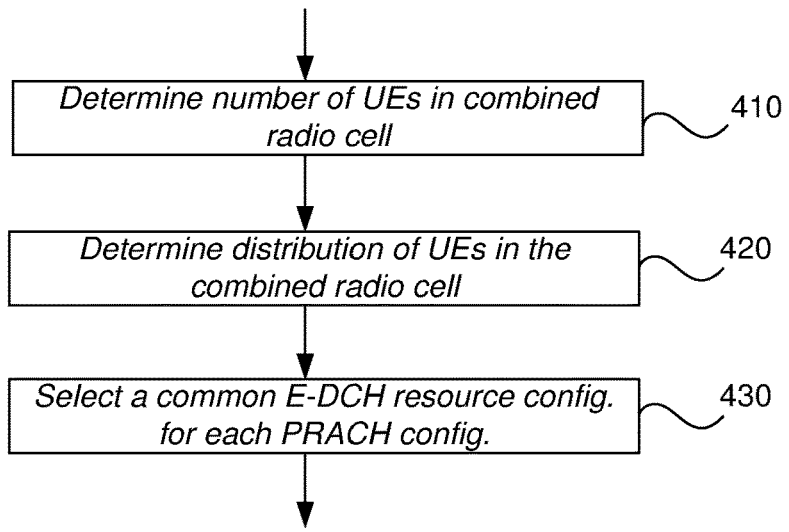
FIG. 4 is a flowchart of an example method performed by a network node.

With reference to FIG. 4, an example method performed by, or otherwise implemented in, a network node 10 will be described. Again, the network node 10 operates in a combined radio cell deployment, such as the example illustrated in FIG. 1. The method described in connection with FIG. 4 may be executed either independently or in combination with the method described in connection with FIG. 2.

Action 410: The total number of wireless communication devices that are served in the combined radio cell 10c is determined.

Action 420: The location of each wireless communication device is determined. The location determination may, e.g., be performed in the same or a similar manner as described earlier with respect to FIG. 2. Based on the determined location of each of wireless communication device as well as the determined total number of wireless communication devices that are served in the combined radio cell, a distribution of the wireless communication devices throughout the combined radio cell is determined. That is, the network node 10 determines where the wireless communications are located within the combined radio cell 10c.

Action 430: The network node 10 selects, in dependence of the determined distribution of wireless communication devices throughout the combined radio cell, a common Enhanced Dedicated Channel (E-DCH) resource configuration to match each PRACH configuration of the set of PRACH configurations such that each PRACH configuration is indexed with a corresponding matching common E-DCH resource configuration.

As realized by the inventors, the number of wireless communication devices served concurrently in the combined radio cell 10c may be limited by the number of common E-DCH resource configurations (which is currently 32). By grouping the E-DCH resource configurations with the PRACH configuration and taking the location of the wireless communication devices into account it is made possible to improve the resource utilization in combined radio cells, since the E-DCH resource configurations are better matching the locations of the radio units 20-1, 20-2, 20-3 and the wireless communication devices UE1, UE2, UE3, respectively. As will be understood, the method described in connection with FIG. 4 may be executed at different intervals or continuously such that the grouping of the E-DCH resource configurations and PRACH configurations is changed dynamically.

Figure 5:
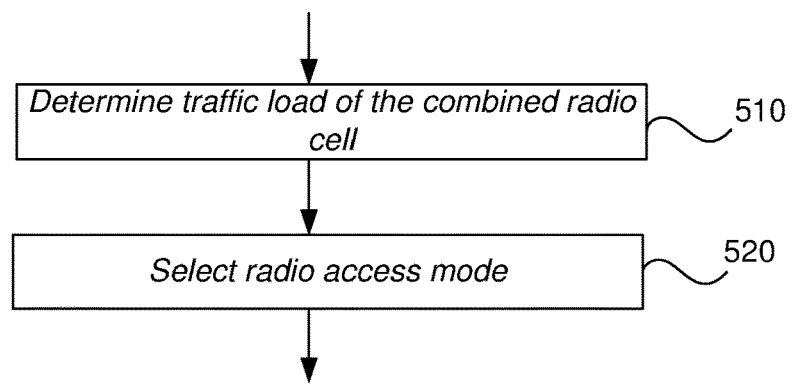
FIG. 5 is a flowchart of an example method performed by a network node.

With reference to FIG. 5, an example method performed by, or otherwise implemented in, a network node 10 will be described. Again, the network node 10 operates in a combined radio cell deployment, such as the example illustrated in FIG. 1. The method described in connection with FIG. 5 may be executed either independently or in combination with the method(s) described in connection with FIG. 2 and/or FIG. 4.

Action 510: The traffic load of the combined radio cell is determined. As is known among persons skilled in the art, there exist various ways of determining, or otherwise calculating, the traffic load of a radio cell and hence this will not be detailed herein.

Action 520: The network node 10 selects either Spatial Re-use (SR) RACH access or Single Frequency Network (SFN) RACH access depending on the determined traffic load of the combined radio cell.

It is and advantage to select the RACH access mode in dependence of the traffic load of the combined radio cell. Thus, the current characteristics of the radio cell may be advantageously taken into account before making the RACH access mode selection.

In some embodiments, the traffic load could be reflected as the number of serving RACH users, or the number of serving FACH users, or the DL power utilization or noise rise or even the number of PRACH access attempts for a given successful UL packet transmission, or RACH access blocking probability etc. When the traffic load is determined to be low, the SFN RACH access may e.g. be applied for data transmission in CELL_FACH and IDLE states. If the traffic load is determined to be higher, the network node 10 could instead select SR RACH access mode. The additional demodulation channels for SR RACH access mode, for example, F-CPICH, D-CPICH or S-CPICH may be always turned on. However, the wireless communication devices may be required to listen to those channels only in SR RACH access mode.

To be more flexible, both SFN RACH access and SR RACH access could be applied in parallel. For example, some nodes may be reserved for SFN RACH access; hence a part of the scrambling codes, signatures, and the common E-DCH resource configurations are reserved for SFN mode. The other nodes may be reserved for SR RACH access and thus the rest of the scrambling codes, signatures, and the common E-DCH resource configurations. Another option is let the wireless communication devices choose the mode for the data transmission by itself. For instance, a wireless communication device could select SFN RACH access for its first RACH access. If the access succeeds, the wireless communication device may follow the legacy SFN procedure to transmit the data. Otherwise, if the number of the access attempts for a given packet would be above a given threshold, the wireless communication device could then select the SR RACH access instead.

An advantage with various embodiments described in this disclosure is that the PRACH configurations are mapped to respective, or specific, radio units of the combined radio cell and that the location of the at least one wireless communication device (e.g. a UE) is determined. Thus, a set of PRACH configurations can be selected by taking the location of the at least one wireless communication device into account. Also, a set of PRACH configurations that is considered appropriate, or suitable, for the at least one wireless communication device is selected based on the determined location. As a consequence, a wireless communication device can perform its PRACH configuration selection from the set of PRACH configurations that are considered appropriate, or suitable. Compared with the existing art, the wireless communication device may thus perform its PRACH configuration selection from a limited number of prioritized candidate PRACH configurations. Furthermore, the wireless communication device may perform its PRACH configuration selection from candidate PRACH configurations where all, or nearly all, candidate PRACH configurations are considered to be appropriate, or suitable, for the wireless communication device in question. Thus, the embodiments described herein may allow for an improved PRACH configuration selection for combined radio cell deployments.

As realized by the inventors, this may further allow for utilizing a similar methodology as the SR mode in CELL_FACH for IDLE and CELL_FACH states. Thus, the resource utilization in IDLE and CELL_FACH states (i.e. those states requiring Random Access) may be improved.

Turning now to FIGS. 6-11, various network nodes and wireless communication devices for implementing the above-described methods will be detailed.

Figure 6:
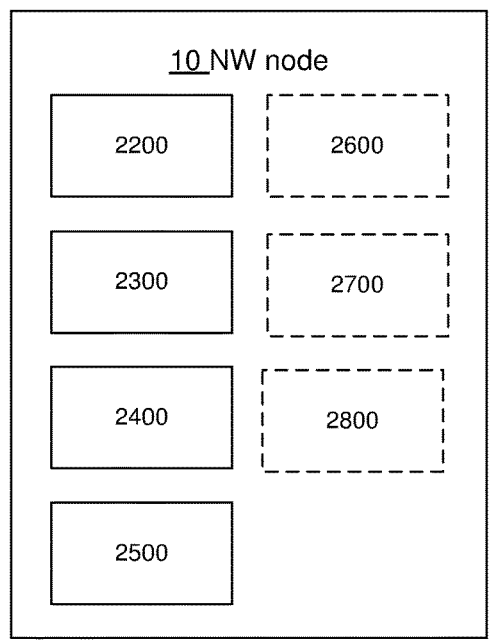
FIGS. 6-8 illustrate various example embodiments of a network node.

With reference to FIG. 6, an example network node 10 will be described. The network node 10 is configured to operate in a combined radio cell deployment where several radio units 20-1, 20-2, 20-3 are controllable by the network node 10 and where each of the several radio units 20-1, 20-2, 20-3 is capable of serving a respective radio cell sector 20-1c, 20-2c, 20-3c of a combined radio cell 10c (see FIG. 1).

The network node 10 comprises means 2200 adapted to establish a plurality of different PRACH configurations, wherein each PRACH configuration is mapped to a respective radio unit of the several radio units. In an embodiment, said means 2200 may be embodied as a processing unit adapted to establish the plurality of different PRACH configurations, wherein each PRACH configuration is mapped to a respective radio unit of the several radio units.

The network node 10 further comprises means 2300 adapted to determine a location of at least one wireless communication device. In an embodiment, said means 2200 may be embodied as a processing unit adapted to determine the location of said at least one wireless communication device.

Yet further, the network node 10 comprises means 2400 adapted to select, in dependence of the determined location of the at least one wireless communication device, a set of PRACH configurations that is available for the at least one wireless communication device. In an embodiment, said means 2400 may be embodied as a processing unit adapted to select, in dependence of the determined location of the at least one wireless communication device, a set of PRACH configurations that is available for the at least one wireless communication device.

Still further, the network node 10 comprises means 2500 adapted to transmit, to the at least one wireless communication device, a radio signal comprising information about the set of PRACH configurations that is available for the at least one wireless communication device. In an embodiment, said means 2700 may be embodied as an output unit, such as a transmitter, adapted to transmit said radio signal comprising information about the set of PRACH configurations that is available for the at least one wireless communication device.

In some embodiments, each radio unit of said several radio units 20-1, 20-2, 20-3 may be mapped to one or several PRACH configurations.

The network node 10 may additionally comprise means 2600 adapted to receive a radio signal from another network node, the radio signal comprising information about the established plurality of PRACH configurations. In an embodiment, said means 2600 may be embodied as an input unit, such as a receiver, adapted to receive the radio signal comprising information about the established plurality of PRACH configurations.

Alternatively, or additionally, the network node may comprise means 2700 adapted to map each PRACH configuration of the plurality of PRACH configurations to a respective radio unit. In an embodiment, said means 2700 may be embodied as a processing unit adapted to map each PRACH configuration of the plurality of PRACH configurations to a respective radio unit.

Still further, the network node may comprise means 2800 adapted to collect location information from each one of the several radio units. The location information comprises information indicative of the location of the at least one wireless communication device. For instance, the location information may comprise information about measured signal parameters related to radio link quality. Advantageously, but not necessarily, the location information may comprise information about F-CPICH measurements performed by the at least one wireless communication device. In an embodiment, said means 2800 may be embodied as an input unit adapted to collect location information from each one of the several radio units. For example, the input unit may be a receiver adapted to receive location information from each one of the several radio units.

In some embodiments, the network node 10 may additionally, or alternatively, comprise:
- means (e.g. a processing unit (not shown)) adapted to determine a total number of wireless communication devices that are served in the combined radio cell;
- means (e.g. a processing unit (not shown)) adapted to determine, based on a determined location of each of the wireless communication devices in the combined radio cell as well as the determined total number of wireless communication devices that are served in the combined radio cell, a distribution of wireless communication devices throughout the combined radio cell; and
- means (e.g. a processing unit (not shown)) adapted to select, in dependence of the determined distribution of wireless communication devices throughout the combined radio cell, a common E-DCH resource configuration to match each PRACH configuration of the set of multiple PRACH configurations such that each PRACH configuration is indexed with a corresponding matching common E-DCH resource configuration.

In still other embodiments, the network node 10 may additionally, or alternatively, comprise:
- means (e.g. a processing unit (not shown)) adapted to determine a traffic load of the combined radio cell; and
- means (e.g. a processing unit (not shown)) adapted to select either SR RACH access or SFN RACH access depending on the determined traffic load of the combined radio cell.

Figure 7:
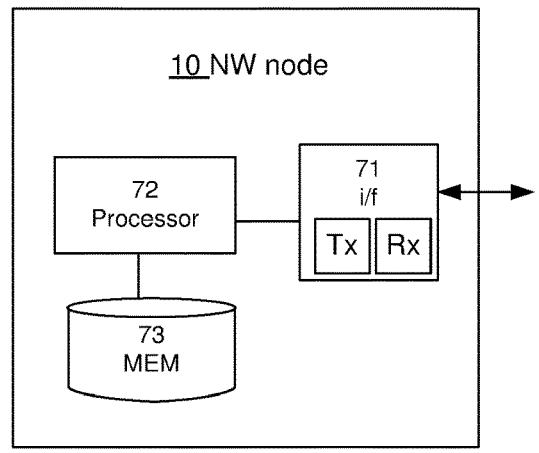

With further reference to FIG. 7, an example implementation of a network node is disclosed. The network node 10 is configured to operate in a combined radio cell deployment where several radio units 20-1, 20-2, 20-3 are controllable by the network node 10 and where each of the several radio units 20-1, 20-2, 20-3 is capable of serving a respective radio cell sector 20-1c, 20-2c, 20-3c of a combined radio cell 10c (see FIG. 1). The network node 10 comprises a communications interface 71. The communications interface 71 may comprise a transmitter (Tx) and/or a receiver (Rx). Alternatively, the communications interface 71 may comprise a transceiver. Also, the network node 10 comprises a processor 72, and a memory 73. The memory 73 comprises instructions executable by the processor 72, whereby the network node 10 is operative to perform the method according to FIG. 2. Additionally, or alternatively, the memory 73 comprises instructions executable by the processor 72, whereby the network node 1100 is operative to perform the method(s) according to FIG. 4 and/or FIG. 5. In other words, the memory 73 comprises instructions executable by the processor 72, whereby the network node 10 is operative to:
- establish a plurality of different PRACH configurations, wherein each PRACH configuration is mapped to a respective radio unit of the several radio units;
- determine a location of at least one wireless communication device;
- select, in dependence of the determined location of the at least one wireless communication device, a set of PRACH configurations that is available for the at least one wireless communication device; and
- transmit a radio signal comprising information about the set of PRACH configurations that is available for the at least one wireless communication device by means of the communications interface. The radio signal is transmitted to the at least one wireless communication device.

Figure 8:
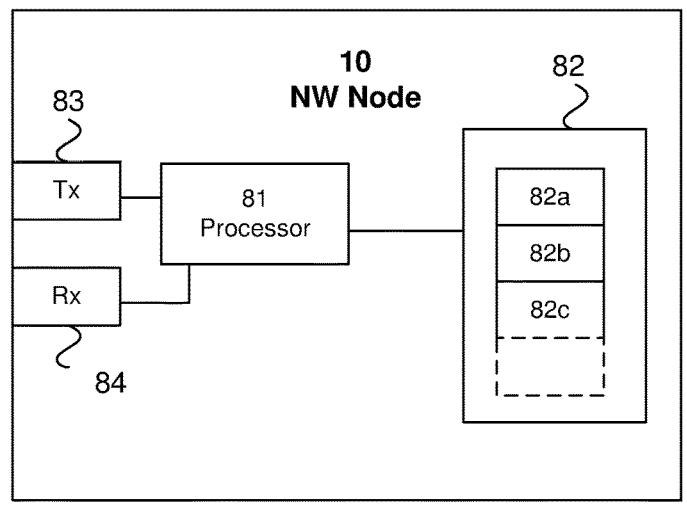

With reference to FIG. 8, an alternative embodiment of a network node 10 will be briefly described. Again, the network node 10 is configured to operate in a combined radio cell deployment where several radio units 20-1, 20-2, 20-3 are controllable by the network node 10 and where each of the several radio units 20-1, 20-2, 20-3 is capable of serving a respective radio cell sector 20-1c, 20-2c, 20-3c of a combined radio cell 10c (see FIG. 1). The network node 10 may comprise a processor 81, various modules 82, a transmitter (Tx) 83 and a receiver (Rx) 84. The transmitter 83 and the receiver 84 may alternatively be implemented as a single transceiver. More particularly, the network node 10 comprises a PRACH configuration module 82a for establishing a plurality of different PRACH configurations, wherein each PRACH configuration is mapped to a respective radio unit of the several radio units. Also, the network node 10 comprises a location determination module for determining a location of at least one wireless communication device. Still further, the network node 10 comprises a selector module 82c for selecting, in dependence of the determined location of the at least one wireless communication device, a set of PRACH configurations that is available for the at least one wireless communication device. Yet further, the transmitter 83 may be configured to transmit (to the at least one wireless communication device) a radio signal comprising information about the set of PRACH configurations that is available for the at least one wireless communication device by means of the communications interface.

Figure 9:
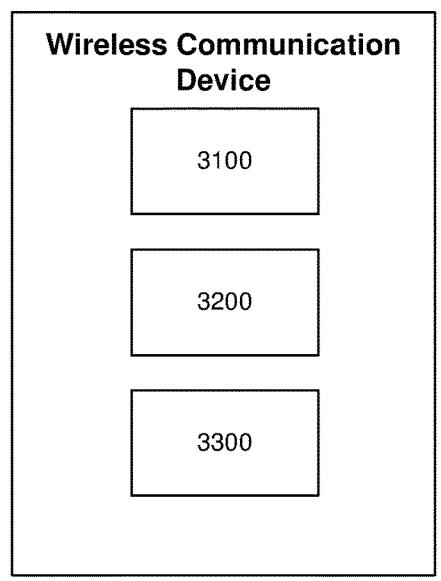
FIGS. 9-11 illustrate various example embodiments of a wireless communication device.

With reference to FIG. 9, an example wireless communication device will be described. The wireless communication device is configured to operate in a combined radio cell deployment where several radio units 20-1, 20-2, 20-3 are controllable by a network node 10 and where each of the several radio units 20-1, 20-2, 20-3 is capable of serving a respective radio cell sector 20-1c, 20-2c, 20-3c of a combined radio cell.

The wireless communication device comprises means 3100 adapted to receive, from the network node, information about a set of PRACH configurations that is available for the wireless communication device, wherein each PRACH configuration of the set of PRACH configurations is mapped to a respective radio unit of the several radio units. In an embodiment, said means 3100 may be embodied as an input unit, e.g. a receiver, adapted to receive said information about the set of PRACH configurations that is available for the wireless communication device.

The wireless communication device further comprises means 3200 adapted to perform radio link quality measurements. In an embodiment, said means 3200 may be embodied as a processing unit adapted to perform radio link quality measurements. Advantageously, but not necessarily, said means 3200 may be adapted to F-OPICH measurements.

Still further, the wireless communication device comprises means 3300 adapted to select a PRACH configuration from the received set of PRACH configurations based on the performed radio link measurements. In an embodiment, said means 3300 may be embodied as a processing unit adapted to select a PRACH configuration from the received set of PRACH configurations based on the performed radio link measurements.

Figure 10:
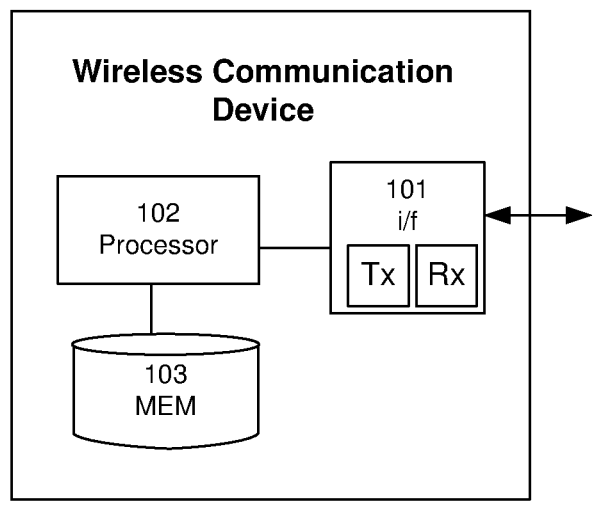

With further reference to FIG. 10, an example implementation of a wireless communication device is disclosed. The wireless communication device is configured to operate in a combined radio cell deployment where several radio units 20-1, 20-2, 20-3 are controllable by a network node 10 and where each of the several radio units 20-1, 20-2, 20-3 is capable of serving a respective radio cell sector 20-1c, 20-2c, 20-3c of a combined radio cell (see FIG. 1). The wireless communication device comprises a communications interface 101. The communications interface 101 may comprise a transmitter (Tx) and/or a receiver (Rx). The communications interface 101 may comprise a transceiver. Also, the wireless communication device comprises a processor 102, and a memory 103. The memory 103 comprises instructions executable by the processor 102, whereby the wireless communication device is operative to perform the method according to FIG. 3. In other words, the memory 103 comprises instructions executable by the processor 102, whereby the wireless communication device is operative to:
- receive, by means of the communications interface 101, information about a set of PRACH configurations that is available for the wireless communication device, wherein each PRACH configuration of the set of PRACH configurations is mapped to a respective radio unit of the several radio units;
- perform radio link quality measurements; and
- select a PRACH configuration from the received set of PRACH configurations based on the performed radio link measurements in order to perform random access.

Figure 11:
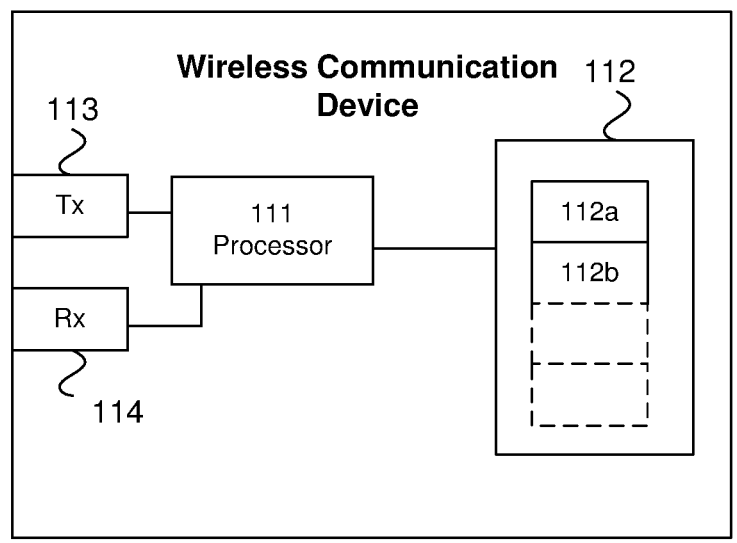

With reference to FIG. 11, an alternative embodiment of a wireless communication device will be briefly described. Again, the wireless communication device is configured to operate in a combined radio cell deployment where several radio units 20-1, 20-2, 20-3 are controllable by a network node 10 and where each of the several radio units 20-1, 20-2, 20-3 is capable of serving a respective radio cell sector 20-1c, 20-2c, 20-3c of a combined radio cell (see FIG. 1). The wireless communication device may comprise a processor 111, various modules 112, a transmitter (Tx) 113 and a receiver (Rx) 114. The transmitter 113 and the receiver 114 may alternatively be implemented as a single transceiver. More particularly, the receiver 114 may be configured to receive information about a set of PRACH configurations that is available for the wireless communication device, wherein each PRACH configuration of the set of PRACH configurations is mapped to a respective radio unit of the several radio units. Moreover, the radio link measurement module 112a may be configured to perform radio link quality measurement, such as F-CPICH measurements. Still further, a selector module 112b may be configured to select a PRACH configuration from the received set of PRACH configurations based on the performed radio link measurements.

Figure 12:
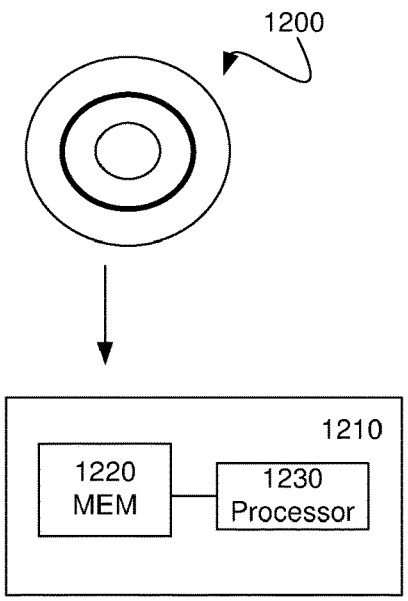
FIGS. 12-13 illustrate other embodiments in the form of computer programs.

Turning now to FIG. 12, yet another embodiment is disclosed. FIG. 12 illustrates a computer program comprising instructions which, when executed on at least one processor 1230 of an apparatus 1210, will cause the apparatus 1210 to: establish a plurality of different PRACH configurations, wherein each PRACH configuration is mapped to a respective radio unit of the several radio units; determine a location of at least one wireless communication device; select, in dependence of the determined location of the at least one wireless communication device, a set of PRACH configurations that is available for the at least one wireless communication device; and to transmit, to the at least one wireless communication device, a radio signal comprising information about the set of PRACH configurations that is available for the at least one wireless communication device. A carrier may comprise the above-mentioned computer program. The carrier may be a computer readable storage medium 1200. Alternatively, the carrier may be one of an electronic signal, optical signal, or radio signal. In one embodiment, the apparatus 1210 may be a network node.

Figure 13:
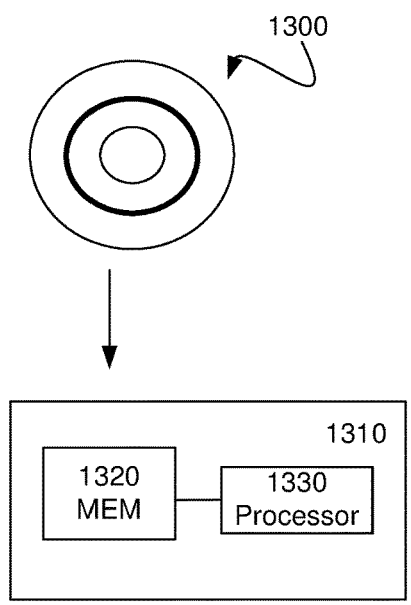

FIG. 13 illustrates still another embodiment. FIG. 13 illustrates a computer program comprising instructions which, when executed on at least one processor 1330 of an apparatus 1310, will cause the apparatus 1310 to: receive, from a network node, information about a set of PRACH configurations that is available for the wireless communication device, wherein each PRACH configuration of the set of PRACH configurations is mapped to a respective radio unit of the several radio units; perform radio link quality measurements; and select a PRACH configuration from the received set of PRACH configurations based on the performed radio link measurements. A carrier may comprise this computer program. The carrier may be a computer readable storage medium 1300. Alternatively, the carrier may be one of an electronic signal, optical signal, or radio signal. In one embodiment, the apparatus 1310 may be a wireless communication device, e.g. a UE.

In the detailed description hereinabove, for purposes of explanation and not limitation, specific details are set forth such as particular architectures, interfaces, techniques, etc. in order to provide a thorough understanding of various embodiments. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein may represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements, including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers.

When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. Also, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims. In addition, singular references do not exclude a plurality. Finally, reference signs in the claims are provided merely as a clarifying example and should not be construed as limiting the scope of the claims in any way.

The invention claimed is:

1. A method performed by a network node of a wireless telecommunication network, the network node operating in a combined radio cell deployment where several radio units are controlled by the network node and where each of the several radio units is serving a respective radio cell sector of a combined radio cell, the method comprising:
    establishing a plurality of different Physical Random Access Channel (PRACH) configurations, wherein each PRACH configuration is mapped to a respective radio unit of the several radio units;
    determining a location of at least one wireless communication device, wherein determining the location of said at least one wireless communication device involves collecting location information from each one of the several radio units, wherein the location information comprises information about Fractional Common Pilot Channel (F-CPICH) measurements performed by the at least one wireless communication device;
    selecting, in dependence of the determined location of the at least one wireless communication device, a set of PRACH configurations that is available for the at least one wireless communication device; and
    transmitting, to the at least one wireless communication device, a radio signal comprising information about the set of PRACH configurations that is available for the at least one wireless communication device.

2. The method of claim 1, wherein each radio unit of said several radio units is mapped to one or several PRACH configurations.

3. The method of claim 1, further comprising:
    receiving a radio signal from another network node, the radio signal comprising information about the established plurality of PRACH configurations.

4. The method of claim 1, further comprising:
    mapping each PRACH configuration of the plurality of PRACH configurations to a respective radio unit.

5. The method of claim 1, wherein the location information comprises information indicative of the location of the at least one wireless communication device.

6. The method of claim 5, wherein the location information comprises information about measured signal parameters related to radio link quality.

7. A method performed by a wireless communication device, which wireless communication device is operating in a combined radio cell deployment where several radio units are controlled by a network node and where each of the several radio units is serving a respective radio cell sector of a combined radio cell, the method comprising:
    receiving, from the network node, information about a set of Physical Random Access Channel (PRACH) configurations that is available for the wireless communication device, wherein each PRACH configuration of the set of PRACH configurations is mapped to a respective radio unit of the several radio units;
    performing radio link quality measurements, wherein performing radio link quality measurements comprises performing Fractional Common Pilot Channel (F-CPICH) measurements; and
    selecting a PRACH configuration from the received set of PRACH configurations based on the performed radio link measurements in order to perform random access.

8. A network node of a wireless telecommunication network, the network node being configured to operate in a combined radio cell deployment where several radio units are controllable by the network node and where each of the several radio units is capable of serving a respective radio cell sector of a combined radio cell, the network node comprising a transmitter circuit and further comprising a processor configured to:
    establish a plurality of different Physical Random Access Channel (PRACH) configurations, wherein each PRACH configuration is mapped to a respective radio unit of the several radio units;
    determine a location of at least one wireless communication device, wherein the location of the at least one wireless communication device is determined by collecting location information from each one of the several radio units, wherein the location information comprises information about Fractional Common Pilot Channel (F-CPICH) measurements performed by the at least one wireless communication device;
    select, in dependence of the determined location of the at least one wireless communication device, a set of PRACH configurations that is available for the at least one wireless communication device; and
    transmit to the at least one wireless communication device, using the transmitter circuit, a radio signal comprising information about the set of PRACH configurations that is available for the at least one wireless communication device.

9. The network node of claim 8, wherein each radio unit of said several radio units is mapped to one or several PRACH configurations.

10. The network node of claim 8, wherein the network node further comprises a receiver circuit and wherein the processor is further configured to receive, via a radio signal received by the receiver circuit from another network node, information about the established plurality of PRACH configurations.

11. The network node of claim 8, wherein the processor is further configured to map each PRACH configuration of the plurality of PRACH configurations to a respective radio unit.

12. The network node of claim 8, wherein the location information comprises information indicative of the location of the at least one wireless communication device.

13. The network node of claim 12, wherein the location information comprises information about measured signal parameters related to radio link quality.

14. A wireless communication device, which is configured to operate in a combined radio cell deployment where several radio units are controllable by a network node and where each of the several radio units is capable of serving a respective radio cell sector of a combined radio cell, the wireless communication device comprising a receiver circuit and further comprising a processor configured to:
    receive from the network node, via the receiver circuit, information about a set of Physical Random Access Channel (PRACH) configurations that is available for the wireless communication device, wherein each PRACH configuration of the set of PRACH configurations is mapped to a respective radio unit of the several radio units;
    perform radio link quality measurements, using the receiver circuit, wherein the radio link quality measurements are performed by performing Fractional Common Pilot Channel (F-CPICH) measurements; and
    select a PRACH configuration from the received set of PRACH configurations based on the performed radio link measurements in order to perform random access.

15. A non-transitory computer-readable medium comprising, stored thereupon, a computer program comprising instructions that, when executed on at least one processor of an apparatus, cause the apparatus to:

establish a plurality of different Physical Random Access Channel (PRACH) configurations, wherein each PRACH configuration is mapped to a respective radio unit of the several radio units;

determine a location of at least one wireless communication device, wherein the location of the at least one wireless communication device is determined by collecting location information from each one of the several radio units, wherein the location information comprises information about Fractional Common Pilot Channel (F-CPICH) measurements performed by the at least one wireless communication device;

select, in dependence of the determined location of the at least one wireless communication device, a set of PRACH configurations that is available for the at least one wireless communication device; and transmit, to the at least one wireless communication device, a radio signal comprising information about the set of PRACH configurations that is available for the at least one wireless communication device.

16. A non-transitory computer-readable medium comprising, stored thereupon, a computer program comprising instructions that, when executed on at least one processor of an apparatus, cause the apparatus to:

receive, from a network node, information about a set of Physical Random Access Channel (PRACH) configurations that is available for the wireless communication device, wherein each PRACH configuration of the set of PRACH configurations is mapped to a respective radio unit of the several radio units;

perform radio link quality measurements, wherein the radio link quality measurements are performed by performing Fractional Common Pilot Channel (F-CPICH) measurements; and select a PRACH configuration from the received set of PRACH configurations based on the performed radio link measurements in order to perform random access.

* * * * *